United States Patent
Wright

(10) Patent No.: US 12,338,871 B2
(45) Date of Patent: Jun. 24, 2025

(54) HYDRAULIC MOUNT ASSEMBLY AND METHOD

(71) Applicant: Vibracoustic USA, Inc., South Haven, MI (US)

(72) Inventor: Nicholas G. Wright, Saint Joseph, MI (US)

(73) Assignee: Vibracoustic USA, Inc., South Haven, MI (US)

( * ) Notice: Subject to any disclaimer, the term of this patent is extended or adjusted under 35 U.S.C. 154(b) by 401 days.

(21) Appl. No.: 17/830,660

(22) Filed: Jun. 2, 2022

(65) Prior Publication Data

US 2022/0389985 A1 Dec. 8, 2022

Related U.S. Application Data

(60) Provisional application No. 63/195,758, filed on Jun. 2, 2021.

(51) Int. Cl.
*F16F 13/10* (2006.01)
*B60K 5/12* (2006.01)

(52) U.S. Cl.
CPC .......... *F16F 13/105* (2013.01); *B60K 5/1208* (2013.01); *F16F 2224/025* (2013.01); *F16F 2226/04* (2013.01)

(58) Field of Classification Search
CPC .............. F16F 13/105; F16F 2224/025; F16F 2226/04; B60K 5/1208
USPC ................. 267/140.11–140.15, 140.2–140.5, 267/141.1–141.7, 219, 220
See application file for complete search history.

(56) References Cited

U.S. PATENT DOCUMENTS

| | | | | |
|---|---|---|---|---|
| 4,588,173 A | * | 5/1986 | Gold | F16F 13/10 267/140.13 |
| 4,886,253 A | * | 12/1989 | Lun | F16F 13/18 267/140.13 |
| 4,932,636 A | * | 6/1990 | Phillips | F16F 13/22 267/140.13 |
| 4,958,810 A | * | 9/1990 | Gold | F16F 13/105 267/140.13 |
| 5,516,084 A | * | 5/1996 | Rizzo | F16F 13/105 267/140.13 |
| 5,595,374 A | * | 1/1997 | Charette | F16F 13/20 267/140.14 |
| 5,964,456 A | * | 10/1999 | Someya | F16F 13/10 267/140.13 |
| 7,163,200 B2 | * | 1/2007 | Dickson | F16F 1/3735 267/293 |
| 11,287,011 B2 | * | 3/2022 | Molesworth | F16F 13/107 |
| 2003/0085498 A1 | * | 5/2003 | Reh | F16F 13/106 267/140.13 |

(Continued)

*Primary Examiner* — Christopher P Schwartz
(74) *Attorney, Agent, or Firm* — Fishman Stewart PLLC

(57) ABSTRACT

A hydraulic mount assembly includes a first track insert (or shell), a second track insert (or shell), and a separating diaphragm (e.g., rubber membrane) as part of a body (e.g., a rubber body) disposed between the first track insert and the second track insert. In embodiments the separating diaphragm forms a seal between a first chamber disposed between a portion of the first track insert and the separating diaphragm, and forms a seal between a second chamber disposed between a portion of the second track insert and the separating diaphragm.

18 Claims, 18 Drawing Sheets

(56) References Cited

U.S. PATENT DOCUMENTS

| | | | |
|---|---|---|---|
| 2005/0056980 A1* | 3/2005 | Kuzukawa | F16F 13/08 267/140.4 |
| 2008/0179798 A1* | 7/2008 | Saiki | F16F 13/26 267/140.14 |
| 2016/0003322 A1* | 1/2016 | Bradshaw | B60K 5/1208 267/140.13 |

* cited by examiner

HYDRAULIC MOUNT ASSEMBLY AND METHOD

CROSS-REFERENCE TO RELATED APPLICATIONS

This application claims the benefit of U.S. Provisional Patent Application Ser. No. 63/195,758, filed on Jun. 2, 2021, the disclosure of which is hereby incorporated herein by reference in its entirety.

TECHNICAL FIELD

The present disclosure generally relates to hydraulic mounts and hydraulic mount assemblies, including hydraulic mounts and assemblies having a single molded assembly with an assembled track.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Hydraulic mounts (or "hydro mounts") may be used, for example, in the automotive industry. Among other things, such mounts may be employed in applications where there is engine bounce or idle shake, and where noise levels are desired to be reduced, vibrations may be mitigated, and/or handling may be improved.

Some hydraulic mount designs may be heavy, large, expensive, complicated, difficult to assemble, and/or inefficient.

Many hydraulic mounts include a core by means of which the mount may be secured to a structure. The direction of the core may be referred to as a central longitudinal axis. Hydraulic mounts may, among other things, generate hydraulic damping in a direction perpendicular to such a central longitudinal axis—so as to provide what may be referred to as "radial damping." Other bearings may be employed to provide damping in a direction of the central longitudinal axis.

To generate axial damping, at least two fluid chambers are commonly arranged one above the other in the direction of the central longitudinal axis. An elastic partition may be provided between the two chambers, and the elastic partition may be referred to as a separating diaphragm.

The load on the separating diaphragm may be particularly high due to the superposition of static loads, dynamic loads, and inflation due to the hydraulic function of the bearing. Consequently, geometrical design can be very difficult. Moreover, limitations such as those associated with mold design and demoldability after a vulcanization process, can make it necessary for an axially damping hydro mount to be assembled from different, individually vulcanized parts and subsequent assembly can be expensive and time-consuming.

There is a desire for solutions/options that minimize or eliminate one or more challenges or shortcomings of hydraulic mounts and assemblies while providing sufficient sealing capability. Among other things, there is a desire to reduce the number of vulcanized parts and/or to securely and define (e.g., tightly define) an outer circumference associated with a separating diaphragm. The foregoing discussion is intended only to illustrate examples of the present field and should not be taken as a disavowal of scope.

SUMMARY

In embodiments, a hydraulic mount may include a first track insert (or shell), a second track insert (or shell), and a separating diaphragm (e.g., rubber membrane) as part of a body (e.g., a rubber body) disposed between the first track insert and the second track insert. In embodiments the separating diaphragm forms a seal between a first chamber disposed between a portion of the first track insert and the separating diaphragm, and forms a seal between a second chamber disposed between a portion of the second track insert and the separating diaphragm.

The foregoing and other aspects, features, details, utilities, and/or advantages of embodiments of the present disclosure will be apparent from reading the following description, and from reviewing the accompanying drawings.

DETAILED DESCRIPTION

Figure 1A:
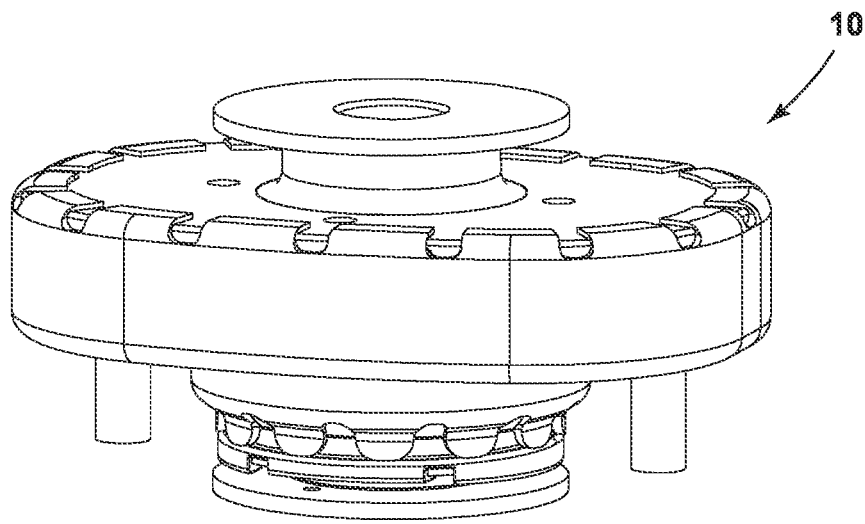
FIG. 1A is a perspective view generally illustrating an embodiment of a hydraulic mount assembly according to aspects or teachings of the present disclosure.

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

With embodiments, a hydraulic body mount (or hydro body mount) may comprise a single molded assembly (e.g., a first assembly, such as subassembly 40 in FIG. 2C and/or molded assembly 100 in FIGS. 5-6E) captured by an assembled track (e.g., a second assembly 82). In embodiments, a single molded assembly body mount may include two portions or sections that may be comprised of nylon. The two portions or sections (e.g., half shells, or first and second track insert portions), which may each be comprised of nylon, may be connected or brought together to retain or capture all or a portion of a rubber component/membrane (see, e.g., FIG. 2C where first track insert 70 and second track insert 80 form second assembly 82, which captures a portion of rubber diaphragm/membrane 90 of first assembly 40), and the collection of components may together create an upper and a lower cavity (see, e.g., hydraulic chambers 32, 34 in FIG. 2C) along with a track (see, e.g., hydraulic track 84 in FIG. 2C). In embodiments, a track (see, e.g., hydraulic track 84 in FIG. 2C) may be created by two molded nylon half inserts/shells (e.g., first track insert 70, second track insert 80) that pinch a rubber component to create a membrane to form an effective seal. The assembly may provide two hydraulic chambers with sufficient sealing capabilities. Such assemblies may meet various desired design requirements, along with providing hydraulic mounts that have less parts, are lighter, and/or provide reduced overall assembly costs. With embodiments, the assembled hydraulic mount may comprise only one single rubber body and the hydraulic mount may generate axial damping, with at least two fluid chambers that may be arranged one above the other in the direction of the central longitudinal axis. As such, the central rubber membrane may be demolded in a radial direction.

As a central rubber membrane or diaphragm can be fixed on an outer circumference, such a configuration can sealingly separate two chambers there, and an outer stiffening element may be provided, such as a connection. In embodiments, a stiffening element may be bonded during vulcanization, and the separating diaphragm may be extended in the direction of the central longitudinal axis at least as far as the stiffening element (which may, among other things, prevent creation of an undercut). In applications, a central separating diaphragm commonly is at least as thick as the outer stiffening element is high-which may limit or restrict design freedom associated with the diaphragm/membrane. However, with embodiments of the disclosure, a central rubber membrane/diaphragm may be clamped or connected on the outer circumference. Such a configuration can allow the height of the outer stiffening element to be greater than the thickness of the membrane/diaphragm. As such, with embodiments, the membrane/diaphragm may be more advantageously exposed and may, for example, have a longer service life. The outer stiffening element on the other hand can be sufficiently thick to comprise a channel of sufficient diameter for tuning hydraulic properties of the hydraulic mount.

Embodiments may involve the use of a part with one molded assembly. Among other features or advantages, the use of two half inserts/shells may reduce the number of components associated with hydraulic mount assemblies. With embodiments, two half inserts/shells may, for example, create a track on an outer edge, and may allow for a longer track length without wrapping around the part more than once. Further, the half inserts/shells may be formed as mirror images of one another, which may provide for simplified or improved part design, manufacturing, and assembly. The foregoing can, among other things, provide for a lowering of an overall height of an assembly, may provide for the formation of two body chambers (with reduced manufacturing limitations), and/or may allow for more travel length in connection with a comparatively lower overall height for an assembly.

Figure 1B:
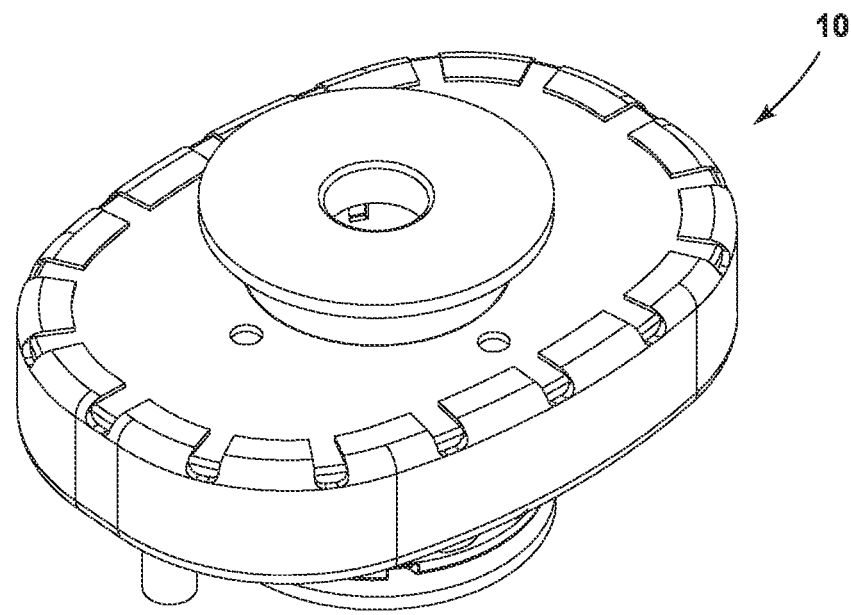
FIG. 1B is another perspective view generally illustrating an embodiment of a hydraulic mount assembly according to aspects or teachings of the present disclosure.

An embodiment of a hydraulic mount assembly 10 according to aspects or teachings of the present disclosure is generally illustrated in FIGS. 1A and 1B. Various views of the hydraulic mount assembly 10 are included in FIGS. 2A through 4B.

Figure 2A:
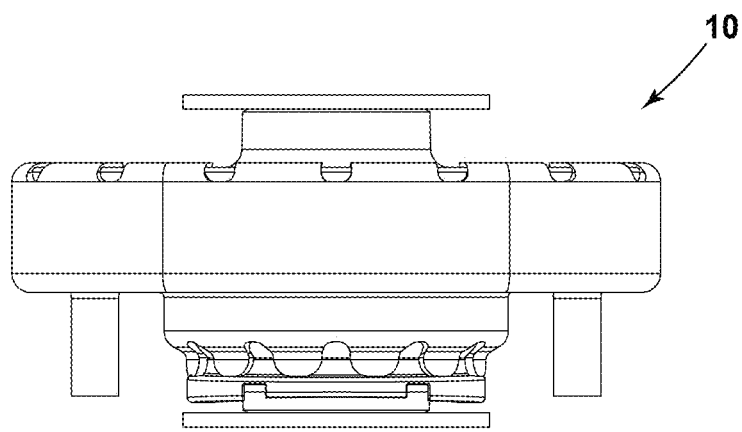
FIGS. 2A and 2B are side elevation views of the embodiment of a hydraulic mount such as generally illustrated in FIG. 1A.
Figure 2B:
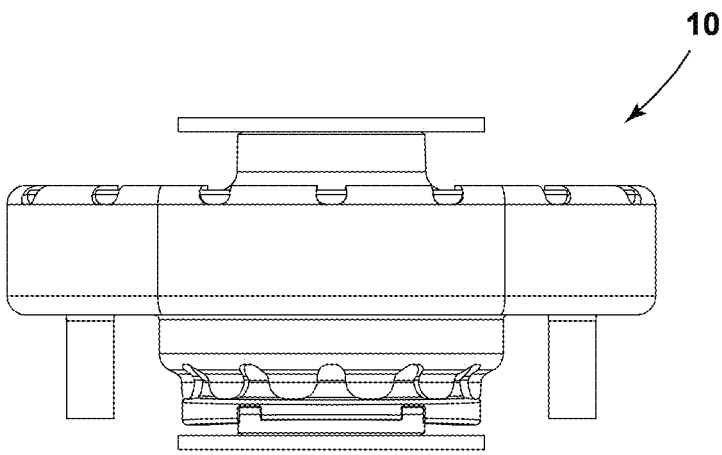

As generally illustrated in FIG. 2A, embodiments of a hydraulic mount assembly 10 may include a retainer bracket 20, a fluid 30, a subassembly 40, a body mount ferrule 50, and/or a crash washer 60.

Figure 2C:
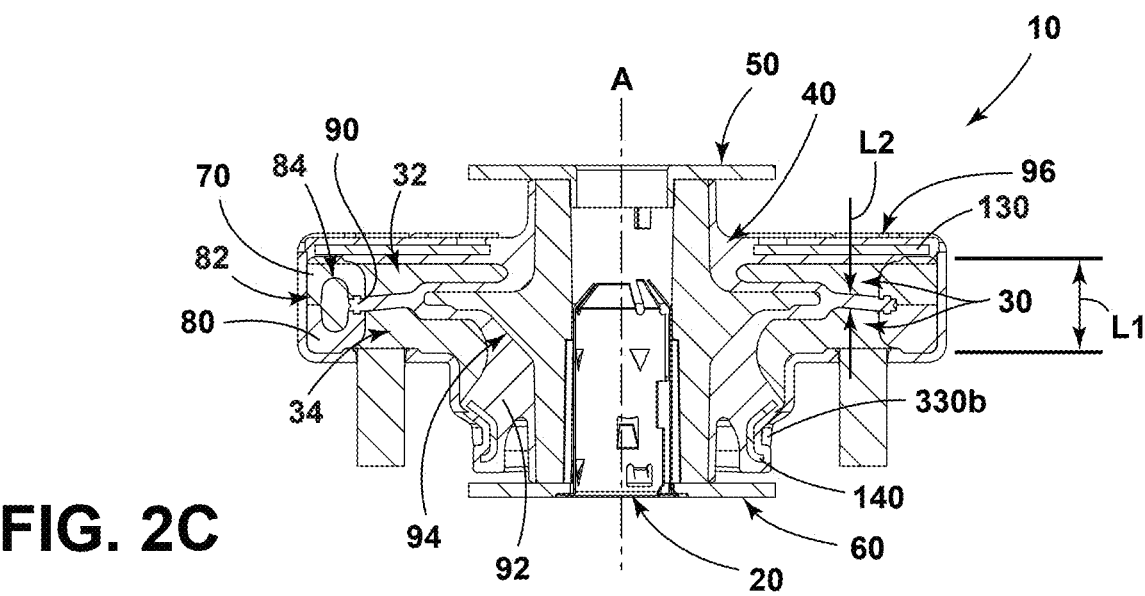
FIG. 2C is a cross-sectional side view of the embodiment of a hydraulic mount as generally illustrated in FIG. 2B.
Figure 3A:
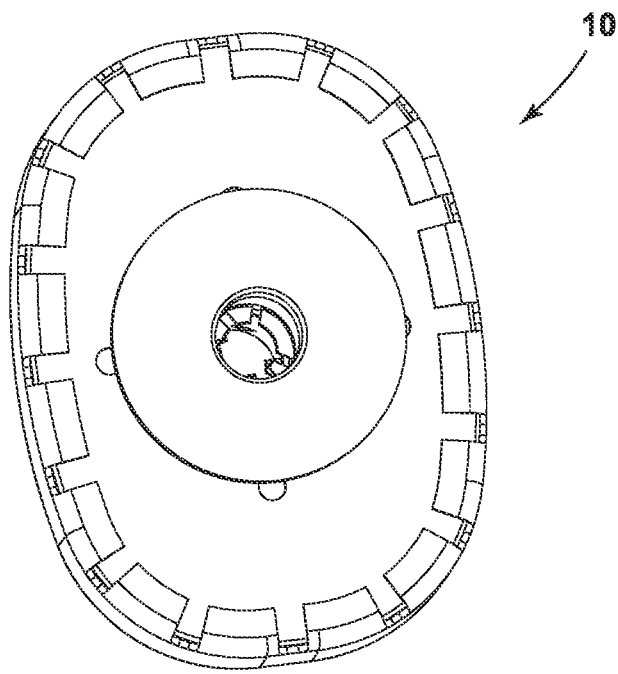
FIGS. 3A and 3B are top plan views generally illustrating embodiments of hydraulic mounts such as generally illustrated in FIG. 1A.
Figure 3B:
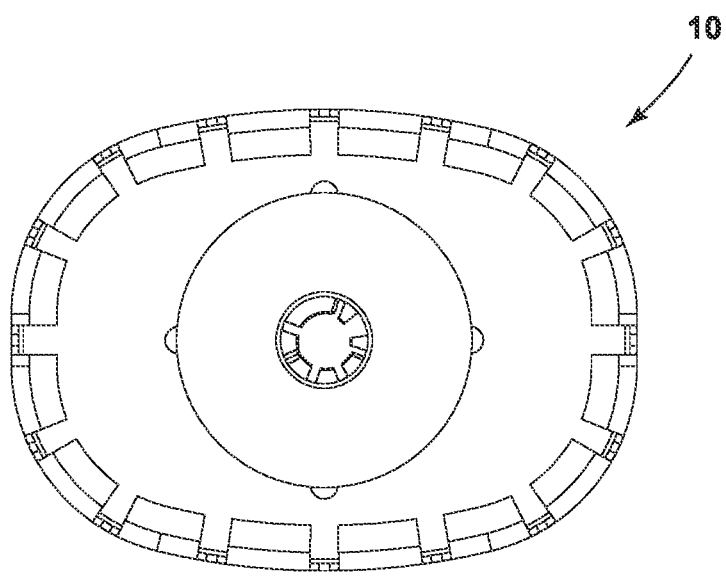
Figure 4A:
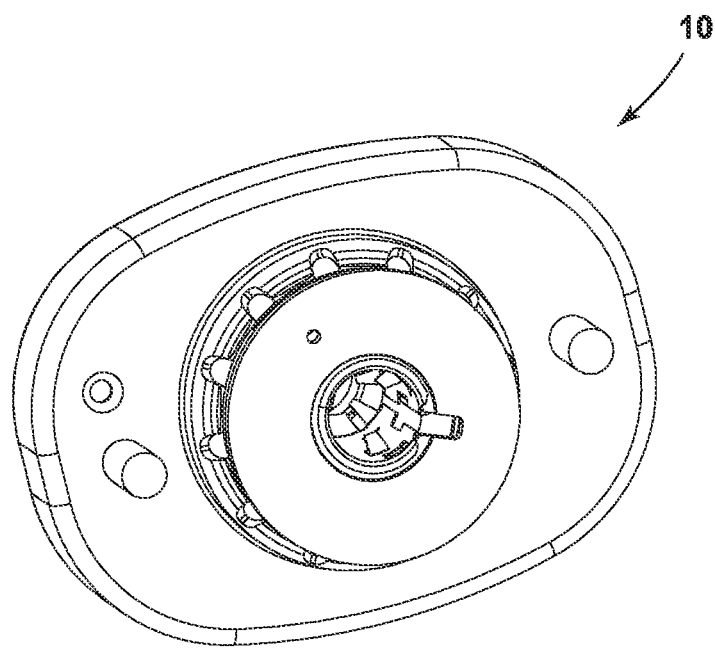
FIGS. 4A and 4B are bottom perspective and bottom views, respectively, generally illustrating embodiments of hydraulic mounts such as generally illustrated in FIG. 1A.
Figure 4B:
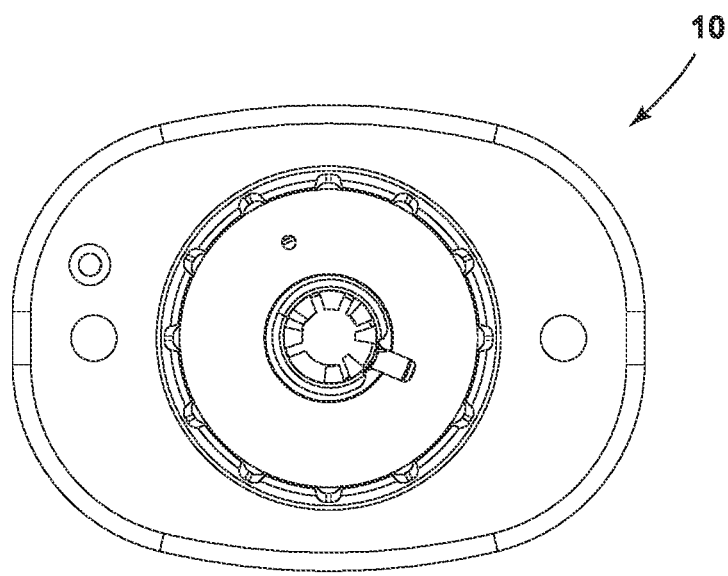

FIG. 2C generally illustrates an embodiment including a first track insert 70 and a second track insert 80. In embodiments, a separating diaphragm/membrane 90—which may comprise a rubber membrane—may be disposed between at least a portion of the first track inert 70 and the second track insert 80. In embodiments, the first track insert 70 and the second track insert 80 may be pressed or clamped together (and may be clamped together on the inside and/or radially inward portion of the assembly)—and may form portions of a fluid track. The separating diaphragm/membrane 90 forms a seal between a first chamber 32 disposed and/or defined between a portion of the first track insert 70 and the separating diaphragm/membrane 90, and a second chamber 34 disposed and/or defined between a portion of the second track insert 80 and the separating diaphragm/membrane 90. In direction of a central longitudinal axis A, the assembled first track insert 70 and the second track insert 80 may have a height or vertical distance L1. A lower rubber section 92 (e.g., a second member) may be provided, and may include an angled portion 94. A lower rubber section 92 may, for example and among other things, provide a measure of stiffness to the assembly. With embodiments, an angled portion 94—which may provide a portion of rubber at an angle—may help to address or prevent high/excess downward loads, which may improve durability, particularly in such region and/or may improve/increase pumping of fluid. Some embodiments may further include an upper rubber membrane 96 (e.g., a first member). A metal plate 130 (see, e.g., FIG. 13) may be embedded within the upper rubber membrane 96.

A rubber diaphragm/membrane 90 may be disposed between a first track insert 70 and a second track insert 80. In embodiments, the diaphragm/membrane may have a minimum thickness L2. The minimum thickness may be smaller than the height of the assembled first track insert and second track insert (i.e., L1). The diaphragm/membrane may be demolded after vulcanization in a radial direction. The assembly of the first track insert and second track insert can clamp the diaphragm/membrane on its outer radial edge and may lock or retain the diaphragm/membrane in place. As such, both tracks/shells may form an outer stiffening element associated with the diaphragm/membrane. Moreover, with such configurations, design freedom of the diaphragm/membrane may not be limited as it may by a radial undercut formed by an outer stiffening element and the diaphragm/membrane.

Figure 5:
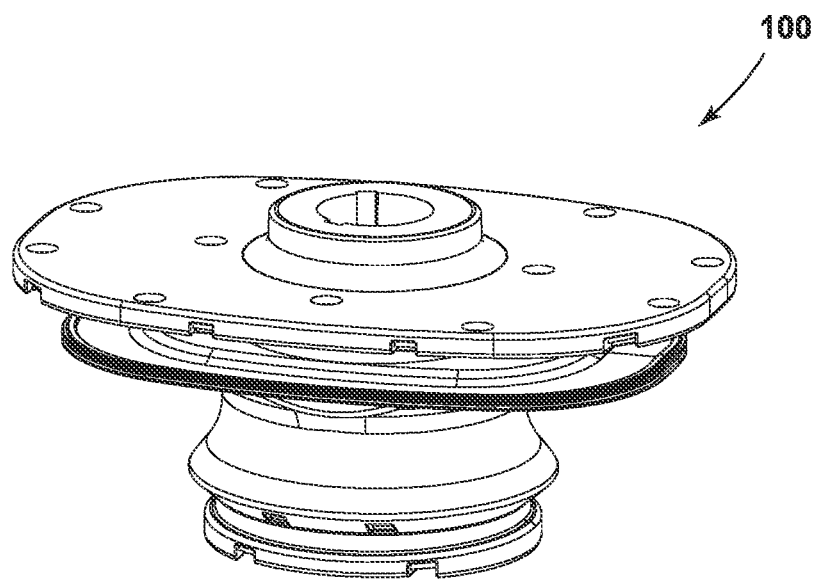
FIG. 5 is a perspective view generally illustrating an embodiment of a molded assembly according to aspects or teachings of the present disclosure.
Figure 6A:
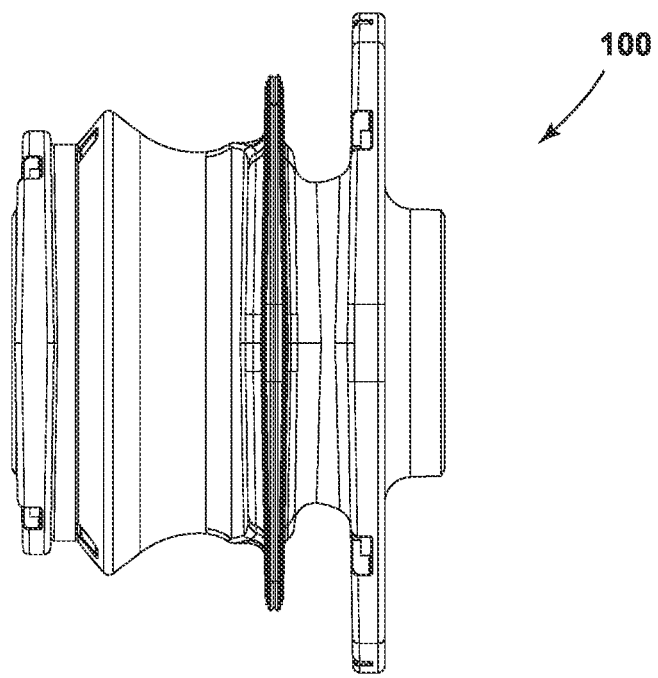
FIGS. 6A, 6B and 6C are side views generally illustrating embodiments of a molded assembly such as generally illustrated in FIG. 5.
Figure 6B:
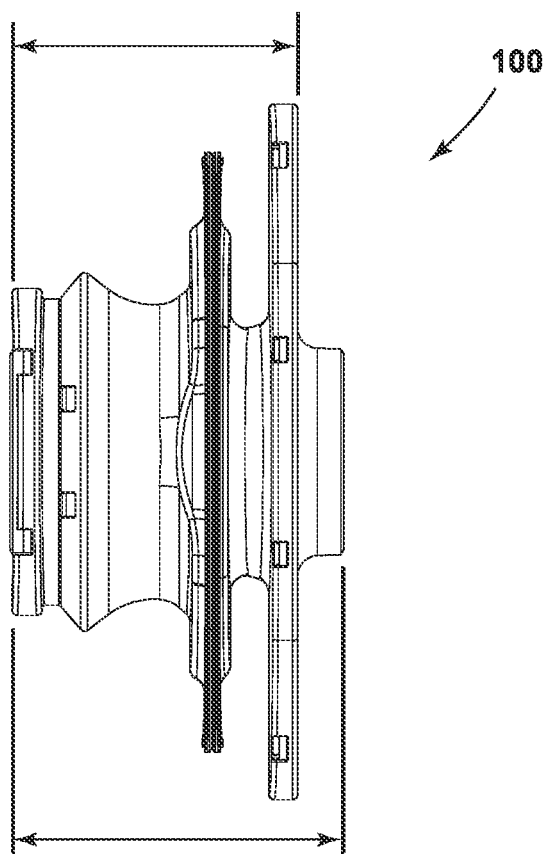
Figure 6C:
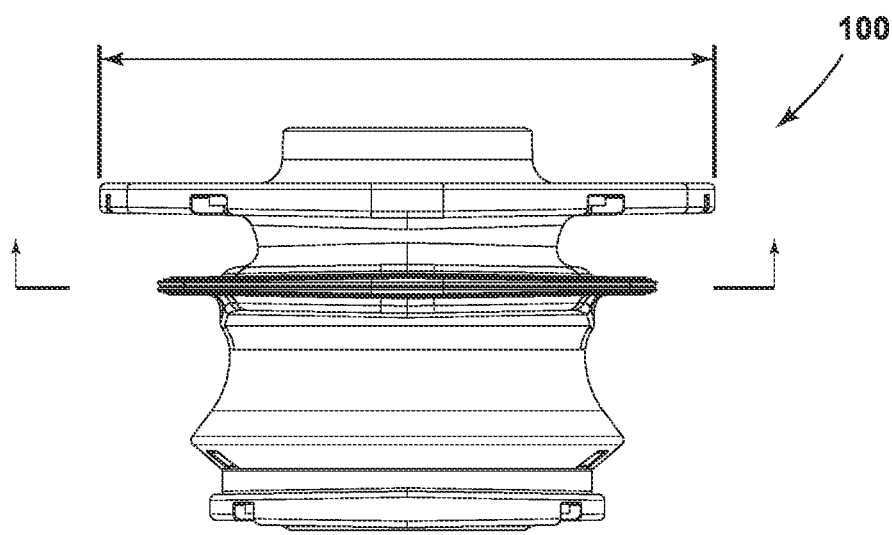
Figure 6D:
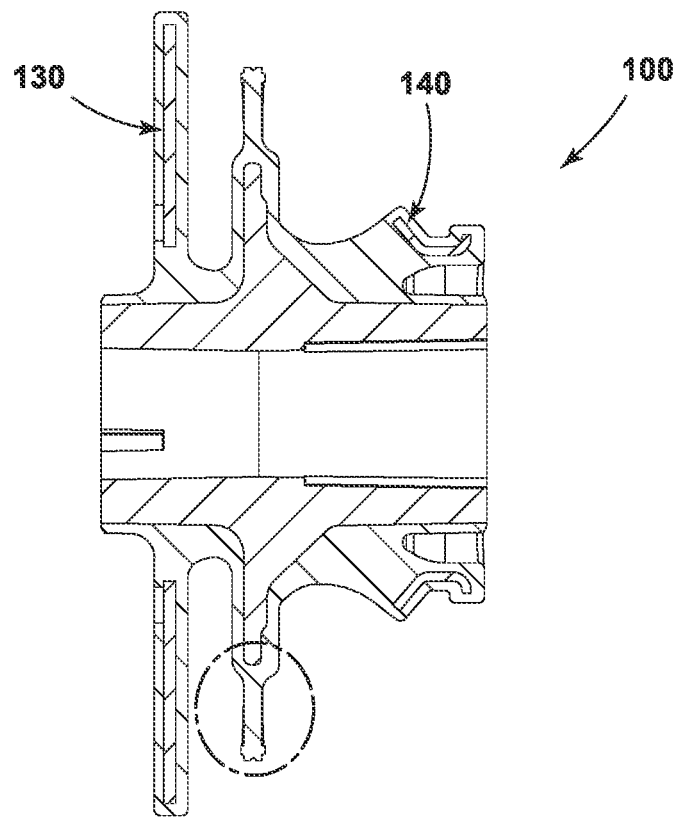
FIG. 6D is a side cross-sectional view generally illustrating an embodiment of a molded assembly such as generally illustrated in FIG. 5.
Figure 6E:
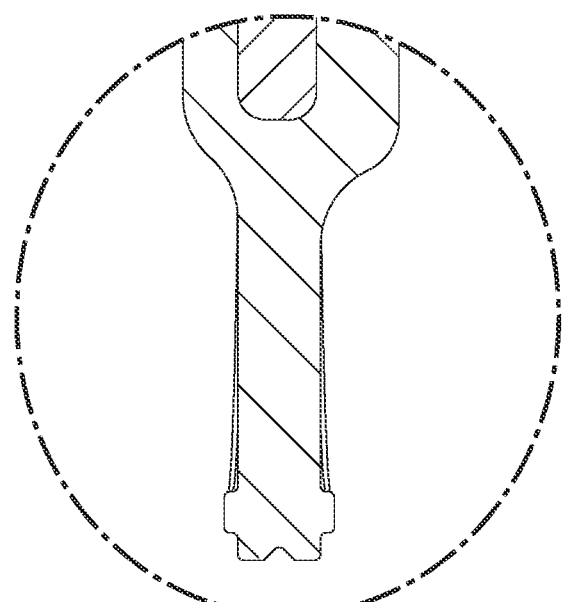
FIG. 6E is an enlarged view of a portion of the molded assembly generally illustrated in FIG. 6D.
Figure 7:
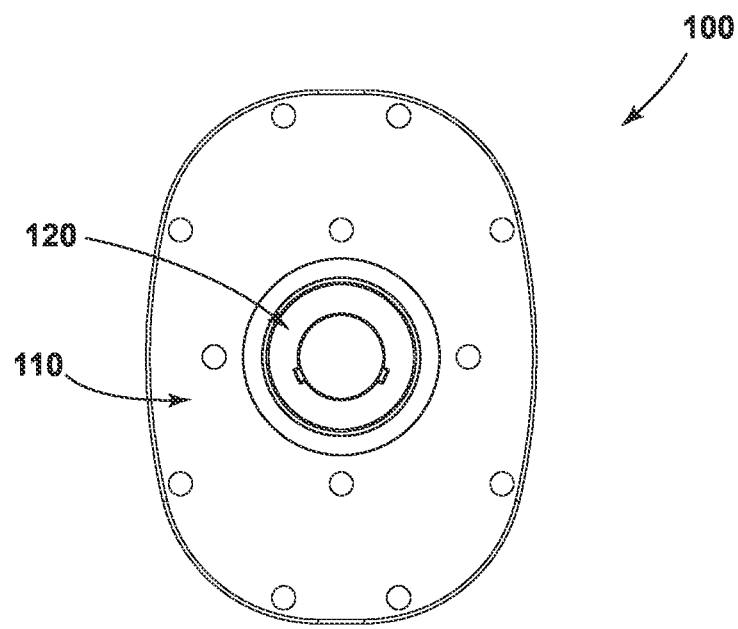
FIG. 7 is top plan view of an embodiment of a molded assembly such as generally illustrated in FIG. 5.
Figure 8:
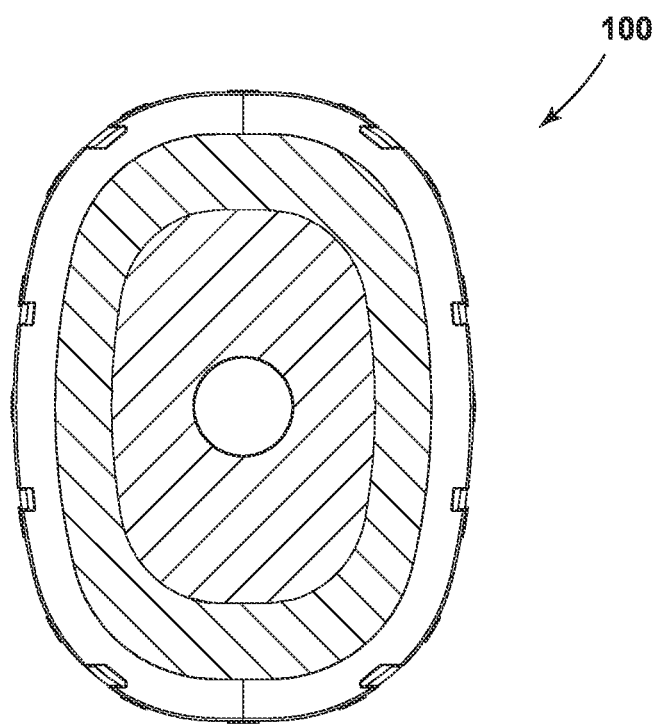
FIG. 8 is bottom view of an embodiment of a molded assembly such as generally illustrated in FIG. 5.
Figure 9A:
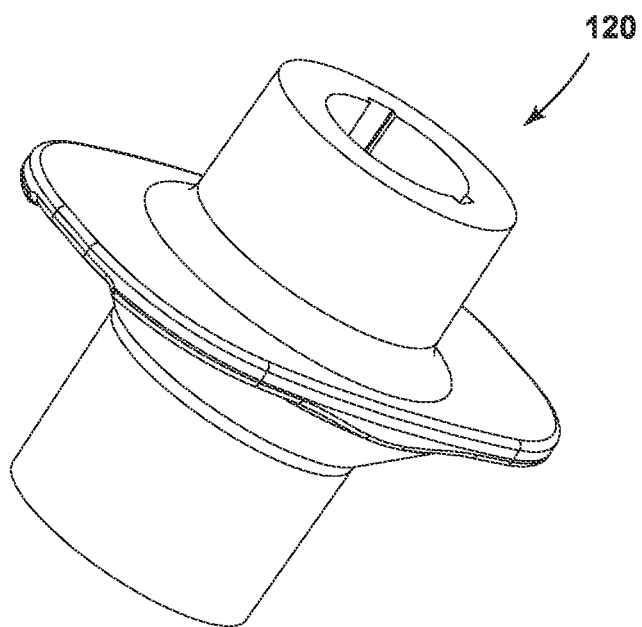
FIGS. 9A and 9B are perspective views generally illustrating an embodiment of an inner core according to aspects or teachings of the present disclosure.
Figure 9B:
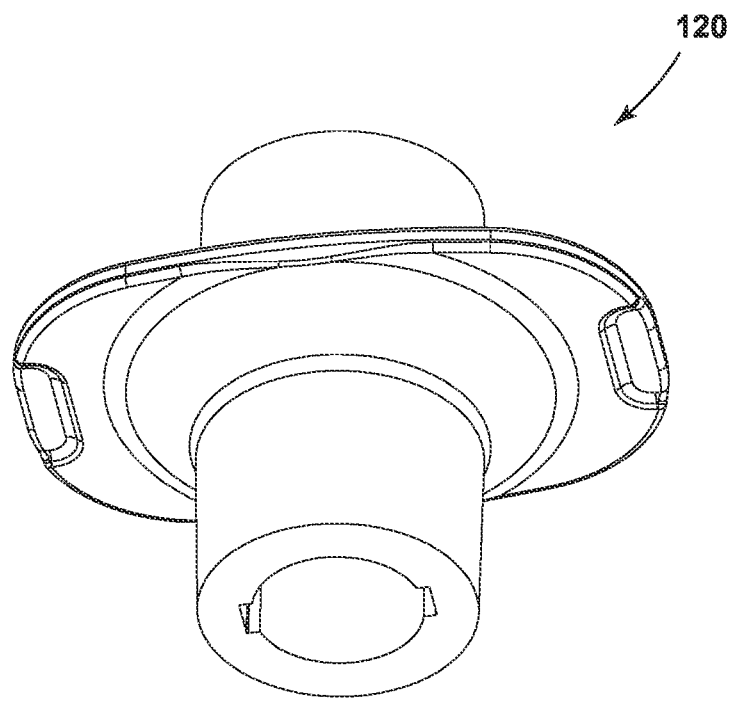
Figure 10A:
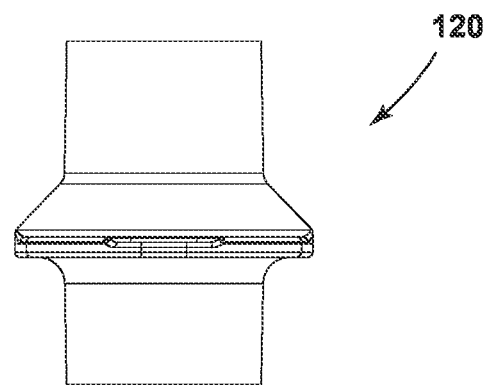
FIG. 10A is a side view generally illustrating an embodiment of an inner core such as generally illustrated in FIG. 9A.
Figure 10B:
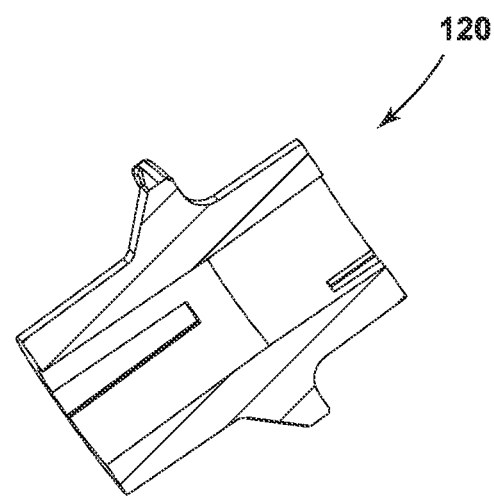
FIGS. 10B and 10C are side cross-sectional views generally illustrating an embodiment of an inner cores such as generally illustrated in FIG. 9A.
Figure 10C:
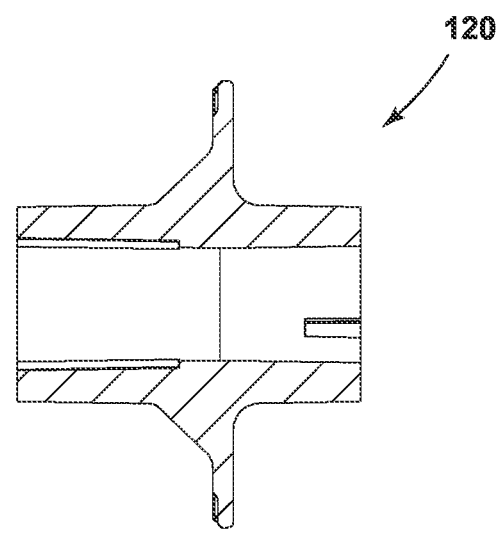
Figure 11:
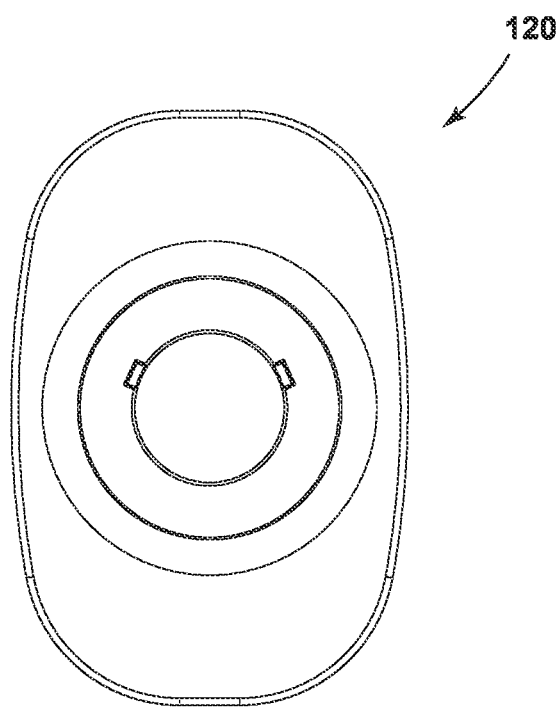
FIG. 11 is top plan view of an embodiment of an inner core such as generally illustrated in FIG. 9A.
Figure 12:
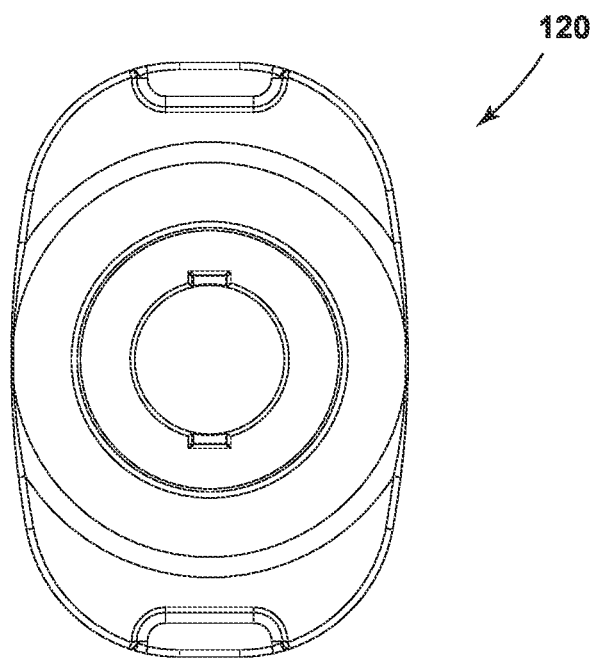
FIG. 12 is bottom view of an embodiment of an inner corer such as generally illustrated in FIG. 5.

FIGS. 5 through 8 generally illustrate an embodiment of a molded assembly 100 according to aspects or teachings of the present disclosure. As generally illustrated in FIGS. 6D and 7, an embodiment of a molded assembly 100 may comprise a rubber 110, an inner core 120, a plate 130, and a ring 140. The molded assembly 100 may essentially be the same as subassembly 40, but in an assembled position. With reference to FIGS. 6D and 6E, the component may include notches—such as, for example, at the lower portion of the enlarged view.

Figure 13:
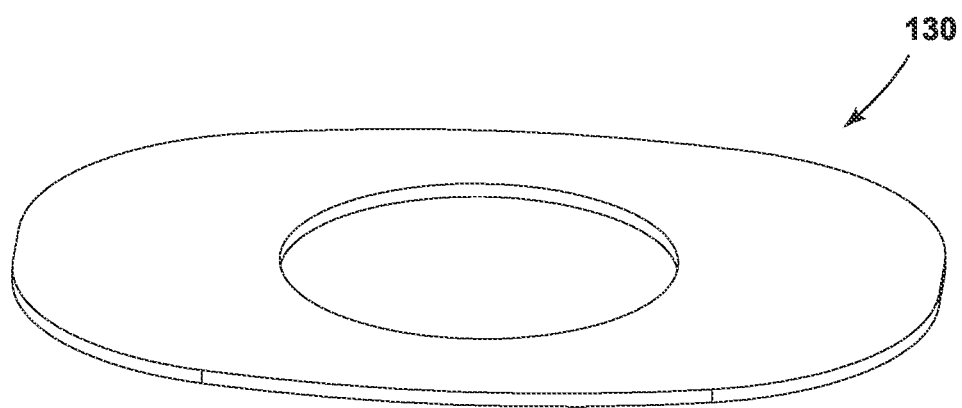
FIG. 13 is a perspective view generally illustrating an embodiment of a plate according to aspects or teachings of the present disclosure.
Figure 14:
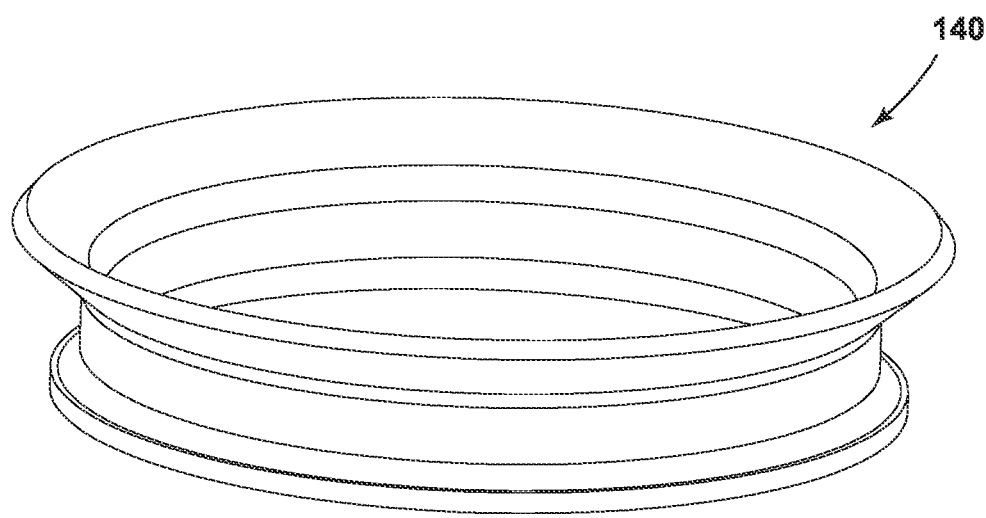
FIG. 14 is a perspective view generally illustrating an embodiment of a ring according to aspects or teachings of the present disclosure.

With further reference to the drawings, embodiments of an inner core 120 are generally illustrated in FIGS. 9A through 12; an embodiment of a plate 130 is generally illustrated in FIG. 13; and an embodiment of a ring 140 is generally illustrated in FIG. 14. In embodiments, a ring 140 may be positioned/captured in a lower portion of a housing (see, e.g., 310 in FIG. 18) and may create a seal feature, for example, at or about a bottom portion of the housing.

Figure 15:
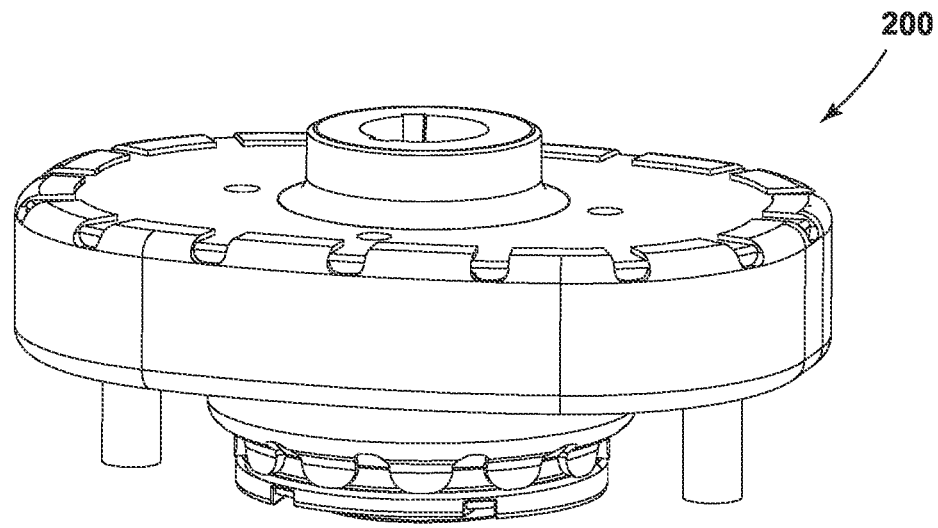
FIGS. 15 and 16 are perspective views generally illustrating embodiments of a sub-assembly according to aspects or teachings of the present disclosure.
Figure 16:
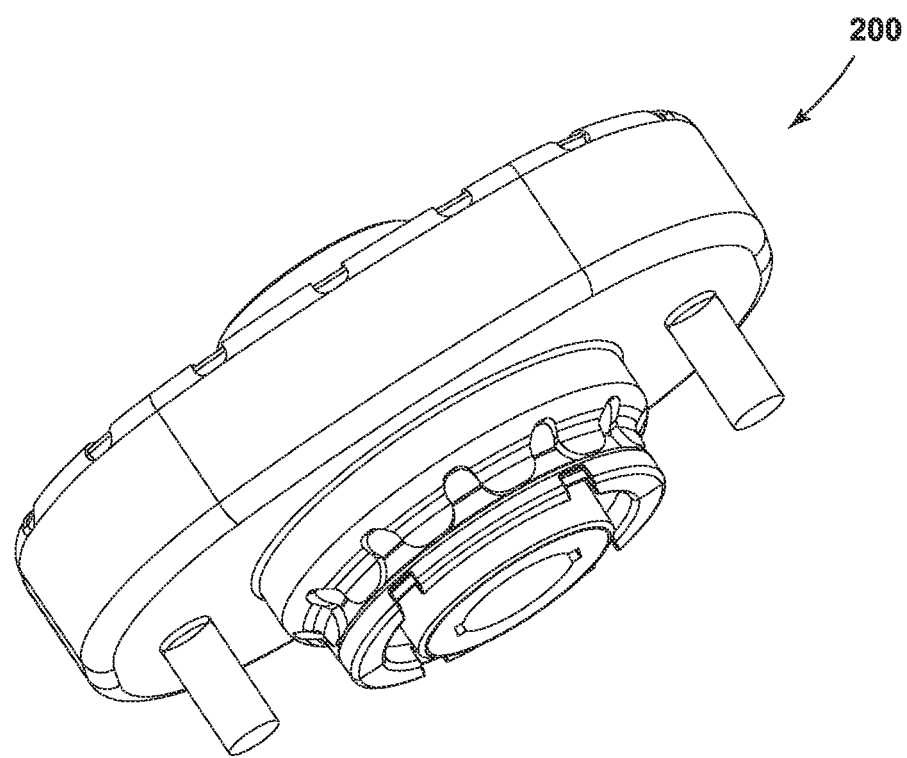
Figure 17A:
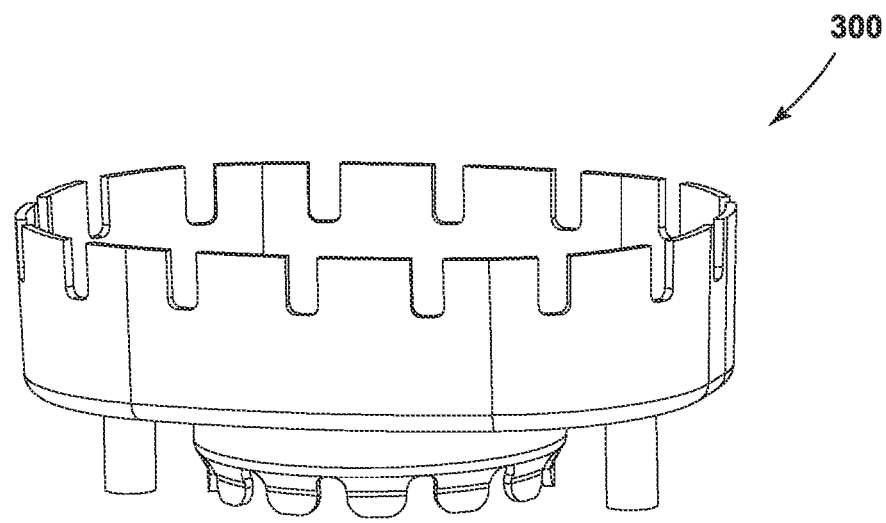
FIGS. 17A and 17B are perspective views generally illustrating embodiments of a housing sub-assembly according to aspects or teachings of the present disclosure.
Figure 17B:
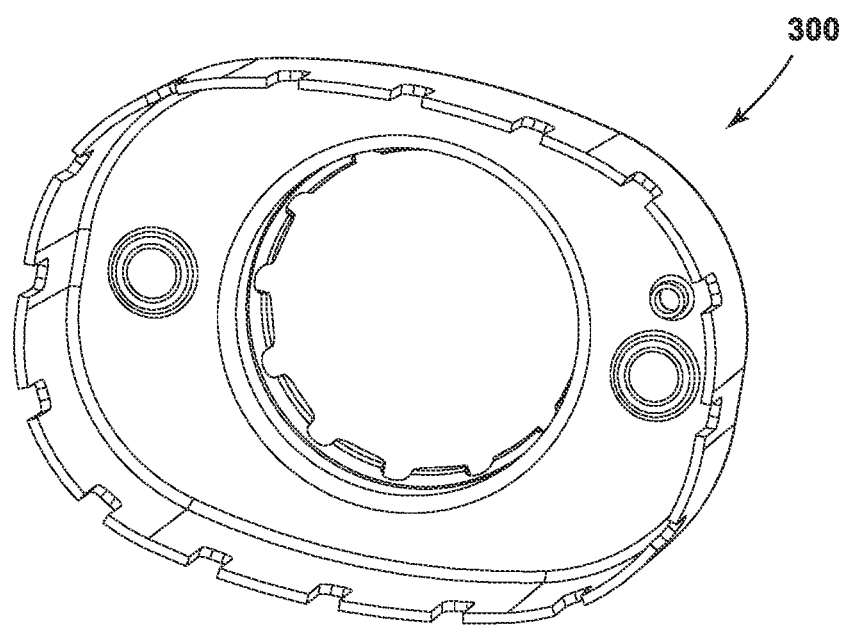
Figure 19:
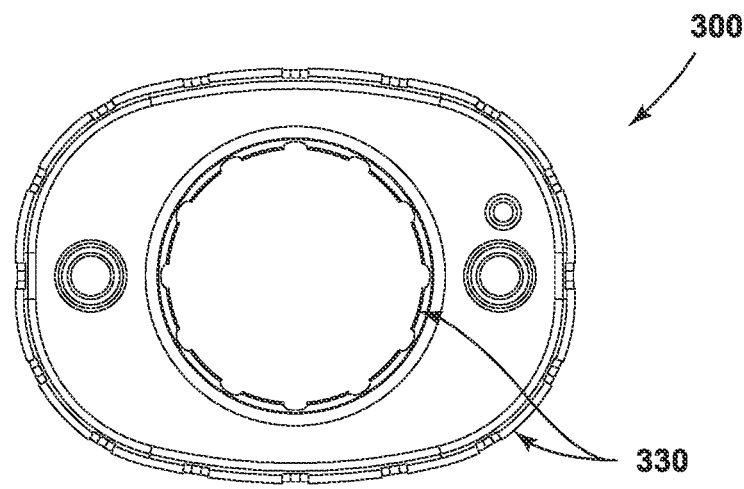
FIGS. 19 and 20 are top plan and bottom views, respectively, generally illustrating an embodiment of a housing sub-assembly such as generally illustrated in FIGS. 17 and 17B.
Figure 18:
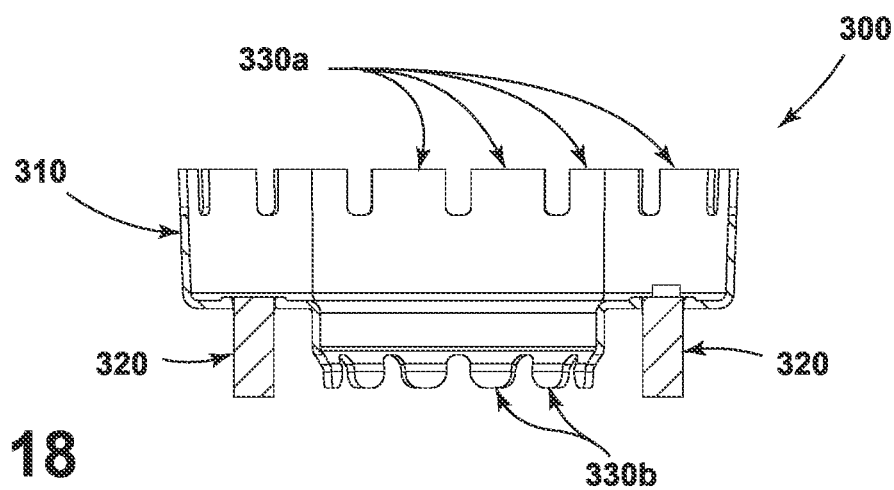
FIG. 18 is side cross-sectional view generally illustrating an embodiment of a housing sub-assembly such as generally illustrated in FIGS. 17 and 17B.
Figure 20:
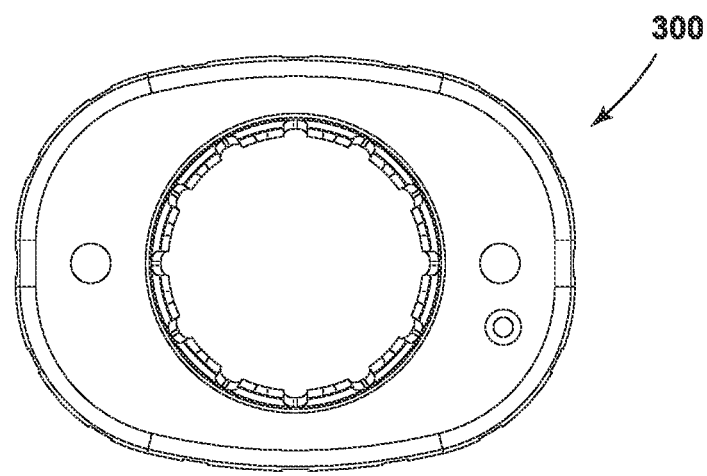

FIGS. 15 and 16 generally illustrate embodiments of a sub-assembly 200 according to aspects or teachings of the present disclosure. Embodiments of a housing sub-assembly 300 are generally illustrated in FIGS. 17A through 20. As generally illustrated in FIG. 18, a housing sub-assembly 300 may include a housing 310, one or more studs (e.g., flush studs 320), and a plurality of tabs 330 that may be swaged in connection with the formation of the assembly. The tabs 330 may include upper tabs 330a and/or lower tabs 330b.

Figure 21A:
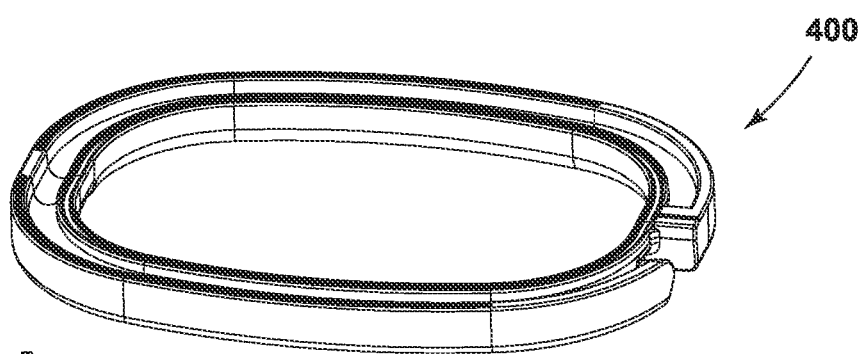
FIGS. 21A, 21B, and 21C are perspective views generally illustrating an embodiment of an insert according to aspects or teachings of the present disclosure.
Figure 21B:
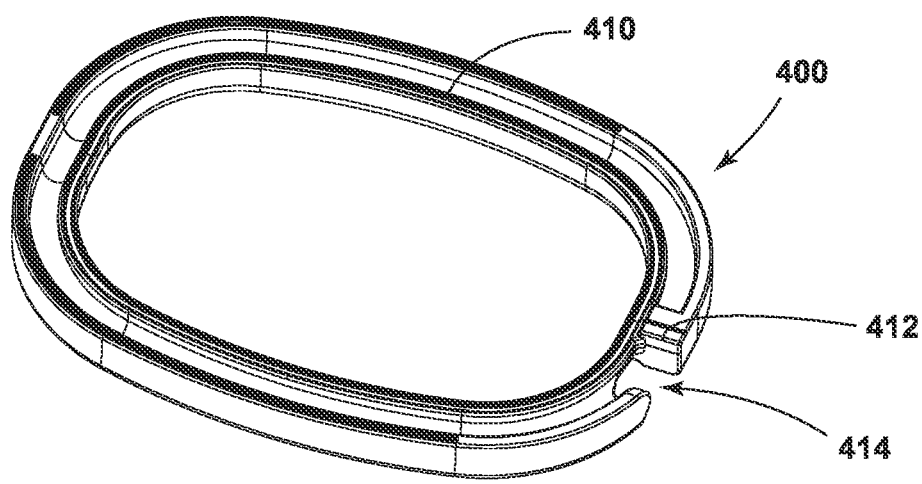
Figure 21C:
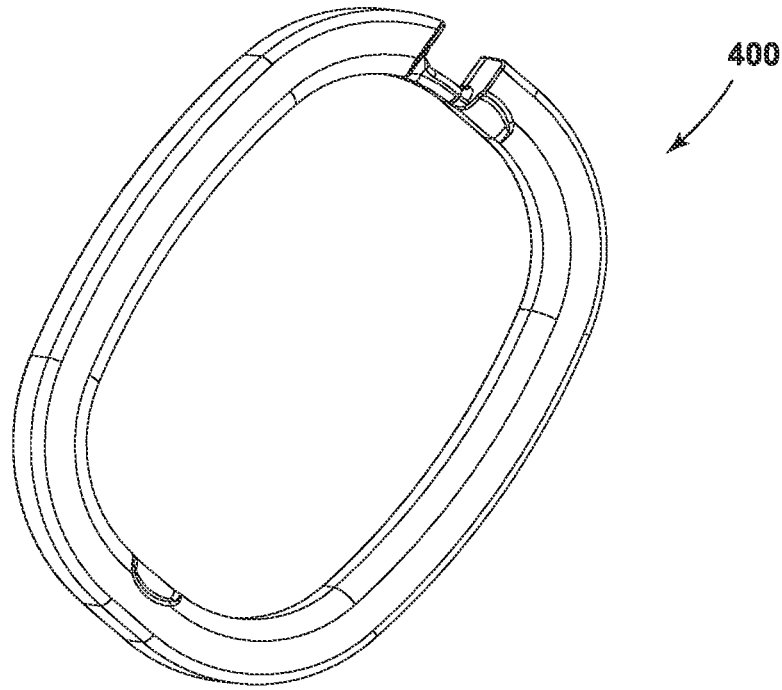

An embodiment of an insert 400 is generally illustrated in several different views in FIGS. 21A, 21B, and 21C. The insert 400 may be comprised of nylon or other suitable material, and may be molded. The insert 400 may be formed to include a track 410. In embodiments, the track 410 may be generally U-shaped or C-shaped. Moreover, with embodiments, a track 410 may have an end formation 412 and an open end 414. With embodiments, two tracks 400 may be provided for each hydraulic mount assembly 10, and may use the same geometries facing each other so that both tracks (e.g., U-shaped tracks) may form a channel (e.g., an O-shaped, oval-shaped, square-shaped, or rectangular-shaped channel). Providing two tracks of the same geometry may, among other things, reduce tooling costs and provide for ease or simplified manufacturing utilizing a common component. It is noted that, with embodiments, when the parts of the hydraulic mount assembly 10 are assembled, the parts (such as the inserts 400) may deform to a degree to create or further a seal. Inserts 400 may comprise various materials. With embodiments, the inserts 400 may be comprised, of a non-rubber material. For example, with some embodiments, the inserts may comprise a metal (e.g., aluminum) and/or a polymer.

In embodiments, two complementary tracks 400 may each provide or create a plane (e.g., a flat, horizontal plane viewed in space)—which, together in combination, may provide a channel, e.g., an O-shaped or oval-shaped channel. Additionally, complementary inserts 400 may, in combination, have an inlet and an outlet of a fluid channel formed by a first track insert and a second track insert and, with embodiments, the distance of such inlet and outlet of the fluid channel formed by the tracks may be equal distance with respect to a central cross sectional plane.

Figure 22A:
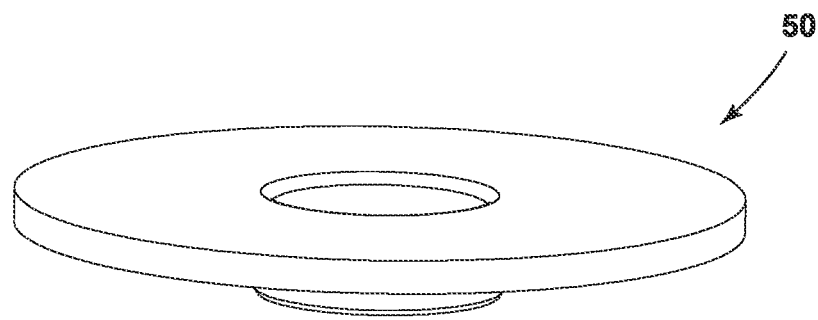
FIGS. 22A and 22B are perspective views generally illustrating an embodiment of a body mount ferrule according to aspects or teachings of the present disclosure.
Figure 22B:
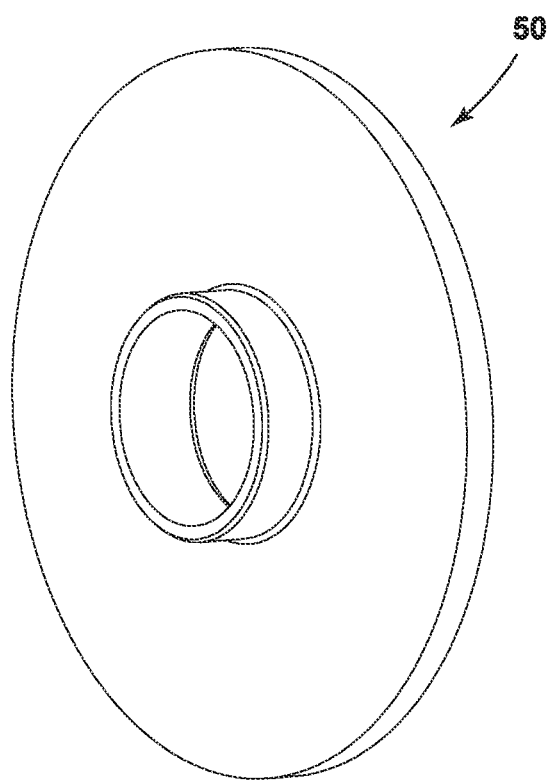

FIGS. 22A and 22B generally illustrates an embodiment of a body mount ferrule 50 (see also, e.g., FIG. 2A).

Figure 23:
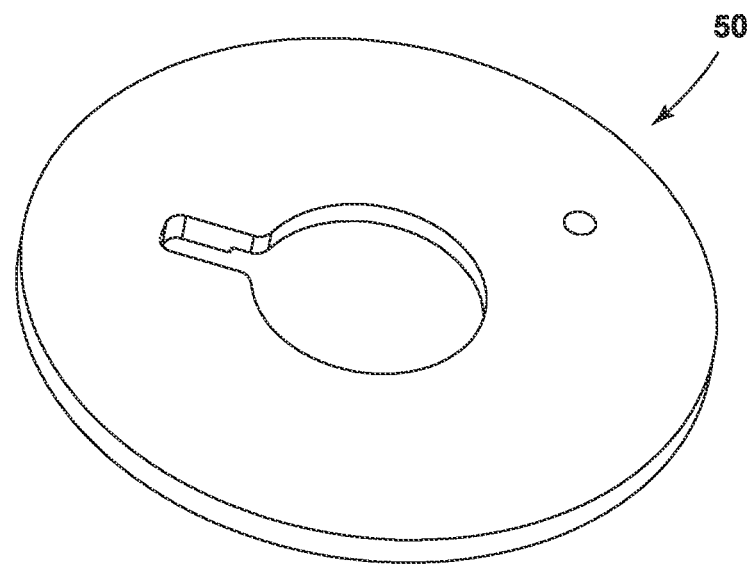
FIG. 23 is a perspective view generally illustrating an embodiment of a body mount crash washer according to aspects or teachings of the present disclosure.

FIG. 23 generally illustrates an embodiment of a body mount crash washer 60 (see also, e.g., FIG. 2A).

Figure 24:
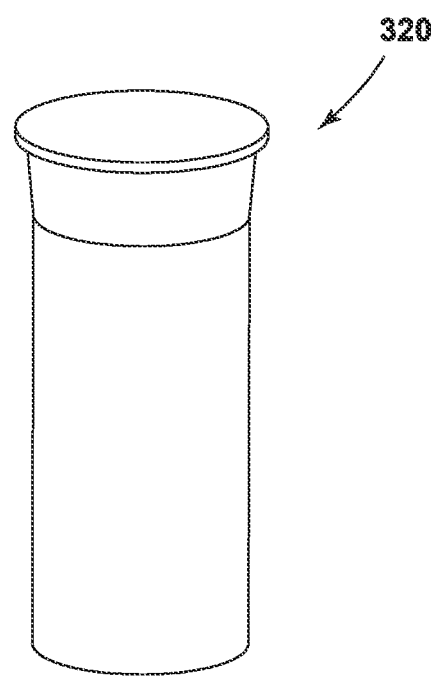
FIG. 24 is a perspective view generally illustrating an embodiment of a flush stud according to aspects or teachings of the present disclosure.

FIG. 24 generally illustrates an embodiment of a flush stud 320 (see, e.g., FIG. 18).

In embodiments, an inner core 120, a plate 130, and ring 140 may provide a level part for molding a molded assembly 100 such as generally illustrated in FIGS. 5 and 6A. The molded assembly 100 may have a track 410 (see, e.g., FIG. 21B) provided above a middle rubber, and a track 410 may be included in connection with a housing sub-assembly 300 (such as generally illustrated in FIG. 17A). A housing sub-assembly 300 may be connected to the molded assembly 100 along with two inserts 400 (e.g., as generally shown in FIGS. 21A-21C). With the components positioned and generally assembled, top tabs of the housing 310 may be crimped over and lower tabs 330b may be crimped in, such as to fix or retain a lower ring 140 in a direction of a central longitudinal axis of the hydraulic mount (see, e.g., FIG. 2C). After this process, the part may utilize a "dry fill" machine to fill fluid into the part. Once the sub-assembly 200 is filled with fluid (e.g., hydraulic fluid), a BB or plug (e.g., steel plug) may be used to plug the fluid fill. Upper and lower components may be connected after fluid fill. A washer (e.g., body mount crash washer 60, FIG. 23) may be pressed on a body mount ferrule 50 (see, e.g., FIG. 22A).

Additionally, for example and without limitation, with some embodiments, a negative "cam" or "chaplets" may be provided to facilitate location(s) for tool steel to contact. Such negative chaplets may, for example, be provided on a top flat surface, such as to hold metal parts within the mold in place during a rubber injection process.

While various specific dimensions, tolerances, and notations may be disclosed in the drawings included with this disclosure, such dimensions, tolerances, and notations are intended to be exemplary and/or comparative with respect to some disclosed and illustrated embodiments and to assist in the understanding of features and teachings of the present disclosure. Such dimensions, tolerances, and notations are not intended to be precise for all embodiments or to limit the scope of the disclosure.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may comprise one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A hydraulic mount, comprising:
a first track insert;
a second track insert; and
a molded assembly including an inner core, a rubber portion disposed on the inner core, and a separating diaphragm;
wherein the separating diaphragm is defined by a section of the rubber portion and projects radially outward from the inner core;
wherein the separating diaphragm is secured between the first track insert and the second track insert; and
wherein the separating diaphragm forms a seal between a first chamber between a portion of the first track insert and the separating diaphragm, and a second chamber between a portion of the second track insert and the separating diaphragm.

2. The hydraulic mount of claim 1, wherein:
the molded assembly includes an upper membrane; and
the upper membrane is defined by a second section of the rubber portion, projects radially outward from the inner core, and is disposed axially spaced apart from the separating diaphragm.

3. The hydraulic mount of claim 2, wherein:
the molded assembly includes a metal plate embedded within the upper membrane; and
a free end of the upper membrane is disposed on and axially contacts the first track insert.

4. The hydraulic mount of claim 1, wherein:
the separating diaphragm comprises rubber; and
the first track insert and the second track insert comprise nylon.

5. The hydraulic mount of claim 1, wherein the separating diaphragm is form fit or press fit between at least a portion of the first track insert and the second track insert.

6. The hydraulic mount of claim 1, wherein:
an outer radial edge of the separating diaphragm is clamped between the first track insert and the second track insert; and
the first track insert and the second track insert form an outer stiffening element associated with the separating diaphragm.

7. The hydraulic mount of claim 1, wherein the first track insert and the second track insert have a non-annular shape in a plane perpendicular to a central longitudinal axis of the hydraulic mount.

8. The hydraulic mount of claim 1, wherein the hydraulic mount includes an upper rubber membrane and a metal plate is embedded within the upper rubber membrane.

9. The hydraulic mount of claim 1, including a housing subassembly comprising a plurality of tabs; and wherein the plurality of tabs comprise top tabs and lower tabs, the lower tabs are configured to fix or retain a lower ring in a direction of a central longitudinal axis of the hydraulic mount, and the top tabs are configured to fix or retain the first track insert and the second track insert.

10. The hydraulic mount of claim 1, wherein the first track insert and the second track insert are generally U-shaped or C-shaped in a cross section plane that is spanned by a vector running in a direction of a central longitudinal axis and a second vector perpendicular to the central longitudinal axis.

11. The hydraulic mount of claim 1, including a lower mount section with a rubber mount that includes an angled portion.

12. The hydraulic mount of claim 1, wherein:
the molded assembly includes a lower section and a lower ring;
the lower section is defined by a second section of the rubber portion, projects radially outward from the inner core, and is disposed axially spaced apart from the separating diaphragm; and
the lower ring is embedded within the lower section.

13. A hydraulic mount, comprising:
a first assembly;
a second assembly including a first track insert and a second track insert;

wherein the first assembly and the second assembly are connected to one another to form a hydraulic track and two hydraulic chambers;

wherein the first assembly includes an inner core, a rubber portion disposed on the inner core, a first member, a second member, and a separating diaphragm;

wherein the first member, the second member, and the separating diaphragm are each defined by a respective section of the rubber portion and project radially outward from the inner core;

wherein the separating diaphragm is disposed axially between the first member and the second member;

wherein a first chamber of the two hydraulic chambers is at least partially delimited by the first track insert, the first member, and the separating diaphragm;

wherein a second chamber of the two hydraulic chambers is at least partially delimited by the second track insert, the second member, and the separating diaphragm; and wherein an outer radial edge of the separating diaphragm is clamped between the first track insert and the second track insert such that the separating diaphragm forms a seal between the first chamber and the second chamber.

14. The hydraulic mount of claim 13, including a housing in which the first assembly and the second assembly are arranged, wherein:

the housing includes a plurality of first tabs that are crimped over and axially engage the first member; and the housing includes a plurality of second tabs that are crimped inward and radially engage the second member.

15. The hydraulic mount of claim 14, wherein the housing at least partially delimits the second chamber.

16. The hydraulic mount of claim 14, wherein:

the first assembly includes a metal plate embedded within the first member; and a free end of the first member is disposed axially between the first track insert and the plurality of first tabs.

17. The hydraulic mount of claim 14, wherein:

the first assembly includes a ring embedded within the second member; and the plurality of second tabs protrude into a channel defined by the ring in a radially inward direction.

18. The hydraulic mount of claim 13, wherein the first member, the second member, and the separating diaphragm are integrally formed such that the rubber portion is a monolithic body.

* * * * *